Aug. 9, 1949.   E. KATZENMEYER ET AL   2,478,487
EXHAUST MANIFOLD CLAMP
Filed Aug. 28, 1946

INVENTORS
EDWIN KATZENMEYER
BY and GENE J. WEBB.

Patented Aug. 9, 1949

2,478,487

UNITED STATES PATENT OFFICE 2,478,487

EXHAUST MANIFOLD CLAMP

Edwin Katzenmeyer and Gene J. Webb,
Akron, Ohio

Application August 28, 1946, Serial No. 693,511

4 Claims. (Cl. 285—129)

The present invention relates to a clamp for coupling the exhaust pipe of an automobile (to which the muffler, etc., are fastened) to the exhaust manifold. It includes the clamp and the exhaust-exhaust manifold assembly formed with it.

The relatively high temperatures of the gases discharged from the exhaust manifold of the internal-combustion engine of an automobile cause the metal of both the exhaust manifold and the exhaust pipe to become heated to temperatures which are in the range of their fusion temperatures, and that of the bolts which hold them together. Such being the case, it frequently happens that the bolts used in coupling the exhaust pipe to the exhaust manifold become fused to the exhaust manifold portion of the coupling. When it becomes necessary to replace the exhaust pipe, and the mechanic attempts to loosen these bolts, they fracture. It is then necessary to drill the fused portion of the fractured bolt from the flange of the exhaust manifold to which it is fused and thread the hold thus produced. This, in itself, is a time-consuming operation; and, in addition, it is frequently necessary to allow a lapse of time for the parts to become sufficiently cooled in order that they may be handled.

The present invention eliminates the difficulties thus encountered by providing a U-shaped clamp of special design which fits over the flanges of the coupling without machining any of the parts. Furthermore, the clamp may be installed while the parts are relatively hot.

The invention will be more readily understood by reference to the accompanying drawings, in which.

Figure 1:
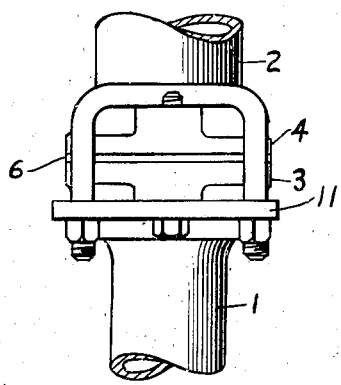
Fig. 1 is a front view of the coupling with the clamp in position.
Figure 2:
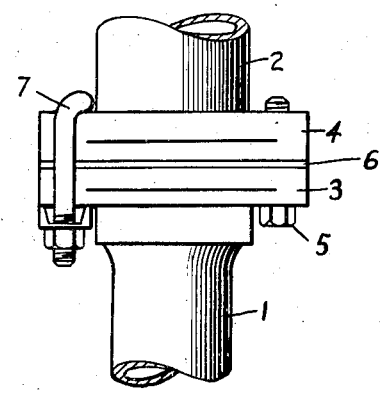
Fig. 2 is a view of the coupling at right angles to the view shown in Fig. 1.
Figure 3:
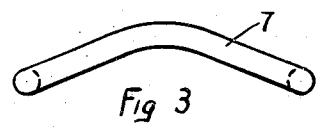
Figs. 3 and 4 are a top and front view of the U bolt of the clamp.
Figure 4:
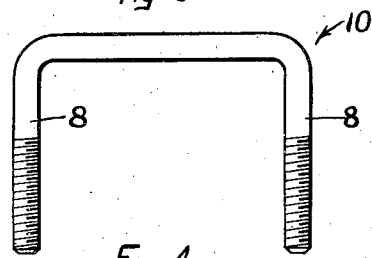
Figure 7:
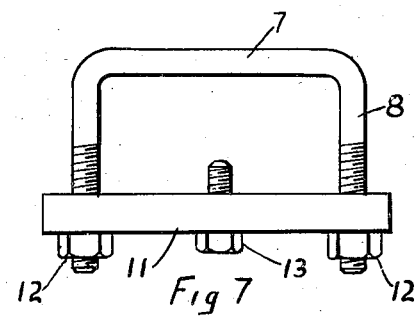
Fig. 7 is a side view of the assembled clamp.
Figure 5:
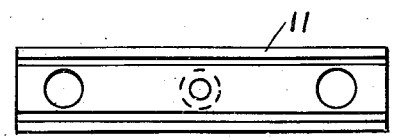
Figs. 5 and 6 are a plan and end view of the channeled bar of the clamp.
Figure 6:

Referring more particularly to the drawings, the new exhaust pipe 1 is coupled to the original exhaust manifold pipe 2 by means of flanges 3 and 4. The flanges are drilled, the holes in the flange of the exhaust manifold are tapped, and in a new automobile the flanges are held together by bolts 5. In removing these bolts to replace the exhaust pipe, the head often comes off, leaving the threaded end fused in the flange. Figs. 1 and 2 show one such bolt end remaining in the flange (Fig. 1) and one bolt entirely replaced by a new bolt 5. The two flanges are sealed by means of the gasket 6.

The present invention greatly simplifies the replacement of a used exhaust pipe, particularly when one or both of the bolts 5 fracture in an attempt to remove them. The crosspiece 7 of the U bolt 10 is angled, the angle defining a plane at right angles to the plane defined by the end pieces 8 of the bolt. The purpose of this bending of this crosspiece is to cause it to pass around the threaded end of the bolt 5, which remains in the flange 3.

The U bolt 10 is placed over the flange 3 on the exhaust manifold behind the threaded end of the bolt 5 fused in the flange 3 (Fig. 1), and the clamp bar 11 is placed under the flange 4 and secured there by means of the nuts 12 threaded onto the ends 8 of the U bolt. The threaded end of the bolt 13, which is threaded through a tapped hole in the channeled clamp bar 11, fits into the hole in the flange 4 which was formerly occupied by the portion of the fractured bolt 5 which was broken off in attempting to remove it. The purpose of the bolt 13 is to hold the clamp in place and prevent it from slipping off from the flanges 3 and 4. The U bolt 10 is generally held in place by the threaded end of the bolt 5 which remains in the flange 3, but friction alone is sufficient to keep the bolt in place.

The clamp bar is shown in a preferred form; namely, a channeled bar. It is, however, not necessary that the brace be channeled: it may be merely of rectangular cross section or angled or any shape which will give sufficient strength. The edges of the channel being narrow cause the channeled bar to lie relatively flat on the unmachined surface of the flange.

It is to be understood that modifications may be made without departing from the scope of the invention as defined in the appended claims.

What we claim is:

1. In an automobile, an exhaust manifold, a flange at the outer end thereof from which the threaded end of a bolt projects, an exhaust pipe, a flange on the inner end thereof, said flanges being held between the crosspiece of a U bolt and a crossbar through which the threaded ends of the U bolt pass, the bar being held to the crosspiece by nuts which are threaded onto the ends of the U bolt, the crosspiece of the U bolt passing between the exhaust manifold and the threaded end of the bolt projecting from the flange of the exhaust manifold.

2. In an automobile, an exhaust manifold, a flange at the outer end thereof from which the threaded end of a bolt projects, an exhaust pipe, a flange on the inner end thereof, said flanges being held between the crosspiece of a U bolt and a channeled crossbar with holes near the ends through which the legs of the U bolt pass, the channeled surface of the bar being tightened against the flange of the exhaust by nuts which are threaded onto the ends of the U bolt, the crosspiece of the U bolt being bent from the plane defined by the threaded ends of the U bolt so as to pass between the exhaust manifold and the threaded end of the bolt projecting from the flange.

3. In an automobile, an exhaust manifold, a flange at the outer end thereof from which the threaded end of a bolt projects, an exhaust pipe, a flange on the inner end thereof, said flanges being held between the crosspiece of a U bolt and a channeled crossbar with holes near the ends through which the legs of the U bolt pass, the channeled surface of the bar being tightened against the flange of the exhaust by nuts which are threaded onto the ends of the U bolt, the crosspiece of the U bolt being bent from the plane defined by the threaded ends of the U bolt so as to pass between the exhaust manifold and the threaded end of the bolt projecting from the flange, a hole in the flange on the exhaust pipe in line with said bolt which projects from the flange of the exhaust manifold, and a hole in the channeled bar in which is threaded a bolt, the threaded end of which enters said hole in the flange.

4. In an automobile, an exhaust manifold, a flange at the outer end thereof from which the threaded end of a bolt projects, an exhaust pipe, a flange on the inner end thereof, said flanges being held between the crosspiece of a U bolt and a bar through the ends of which the threaded ends of the U bolt pass, the bar being held to the flange on the exhaust pipe by nuts which are threaded onto the ends of the U bolt, the crosspiece of the U bolt passing between the exhaust manifold and the threaded end of the bolt projecting from the flange thereof, there being a projection of small cross section from one side of the bar at about the middle thereof, which projection enters a hole in the flange of the exhaust pipe which is in line with the threaded end of the bolt.

EDWIN KATZENMEYER.
GENE J. WEBB.

REFERENCES CITED

The following references are of record in the file of this patent:

UNITED STATES PATENTS

| Number | Name | Date |
| --- | --- | --- |
| 303,075 | Towne | Aug. 5, 1884 |
| 1,225,478 | Murray | May 8, 1917 |
| 1,439,840 | Rockwell | Dec. 26, 1922 |

FOREIGN PATENTS

| Number | Country | Date |
| --- | --- | --- |
| 63,405 | Switzerland | Mar. 22, 1913 |